United States Patent [19]

Motonami et al.

[11] 4,335,902
[45] Jun. 22, 1982

[54] PASSIVE SEATBELT DRIVING MECHANISM

[75] Inventors: Masanao Motonami, Toyota; Yoshiaki Ishikawa, Chiryu, both of Japan

[73] Assignees: Toyota Jidosha Kogyo Kabushiki Kaisha; Aisin Seiki Kabushiki Kaisha, both of Aichi, Japan

[21] Appl. No.: 277,725

[22] Filed: Jun. 26, 1981

Related U.S. Application Data

[63] Continuation of Ser. No. 57,455, Jul. 13, 1979, abandoned.

[30] Foreign Application Priority Data

Jul. 19, 1978 [JP] Japan .................................. 53-99329
Jul. 19, 1978 [JP] Japan .................................. 53-99330
Jul. 19, 1978 [JP] Japan .................................. 53-99331

[51] Int. Cl.$^3$ ............................................ B60R 21/02
[52] U.S. Cl. ..................................... 280/804; 280/803

[58] Field of Search .................. 280/803, 804; 74/110

[56] References Cited

U.S. PATENT DOCUMENTS 3,806,155 4/1974 Hafele .................................. 280/803

Primary Examiner—Richard A. Bertsch
Attorney, Agent, or Firm—Koda and Androlia

[57] ABSTRACT

A movable shaft through which a door opening or closing force is transmitted can move in a first and second grooves of a guide plate, and said movable shaft, when in the first groove, is engaged with an engageable groove of a groove plate to transmit the door opening or closing force to a webbing driving portion for attaching webbings to or separating same from an occupant, and, when in the second groove, slides in a sliding groove of the groove plate so that the webbings can be automatically fastened to or unfastened from the occupant in such a manner that the groove plate is scarcely moved and the door is opened or closed to some extent.

11 Claims, 12 Drawing Figures

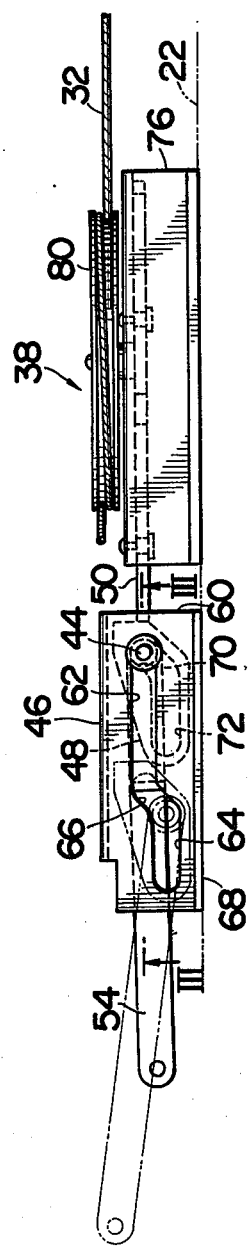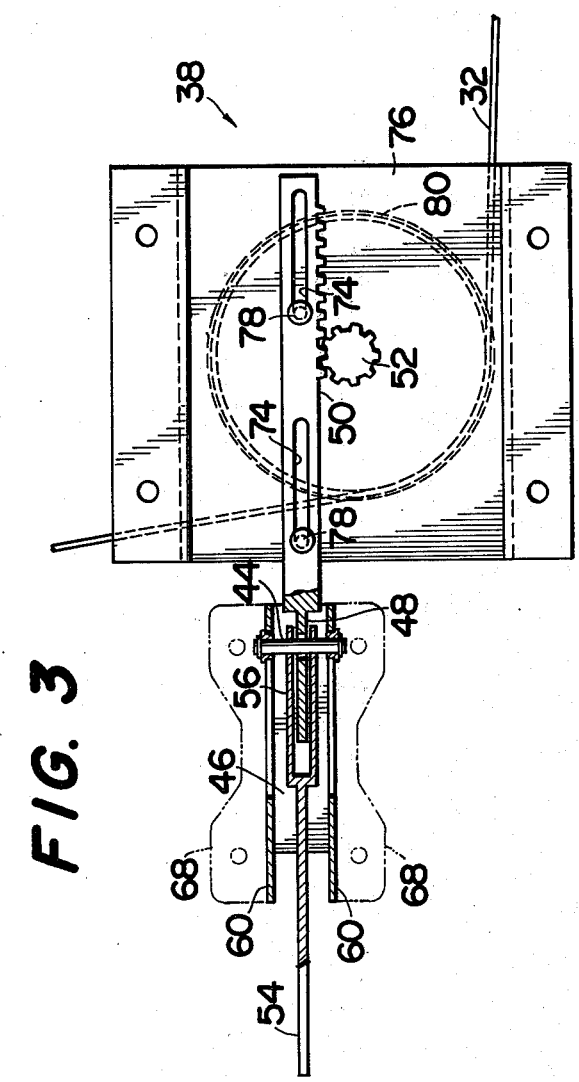

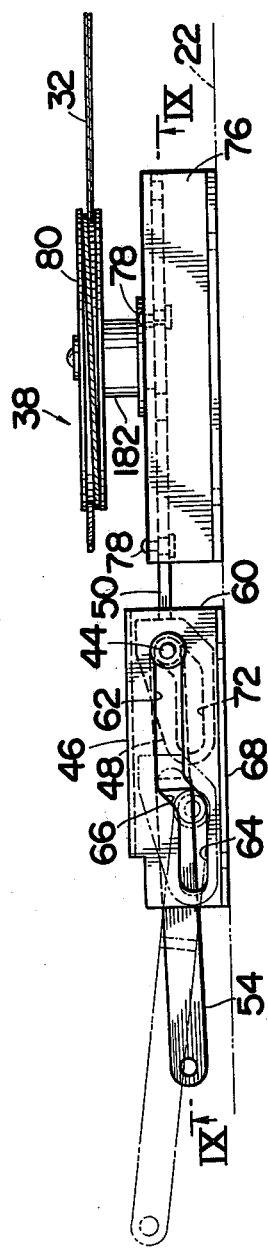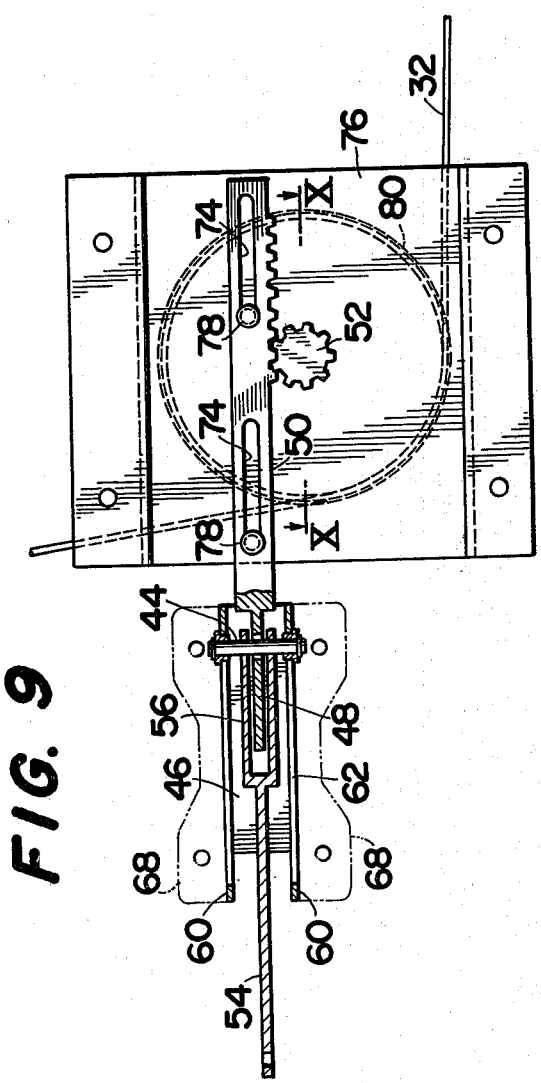

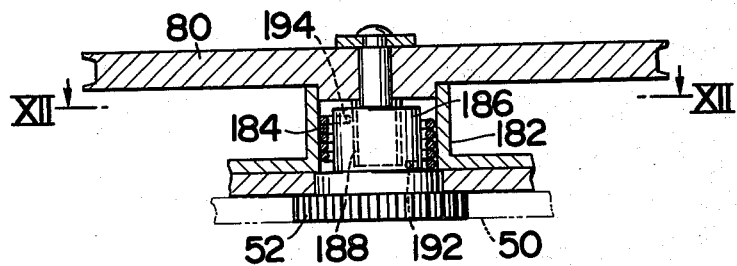
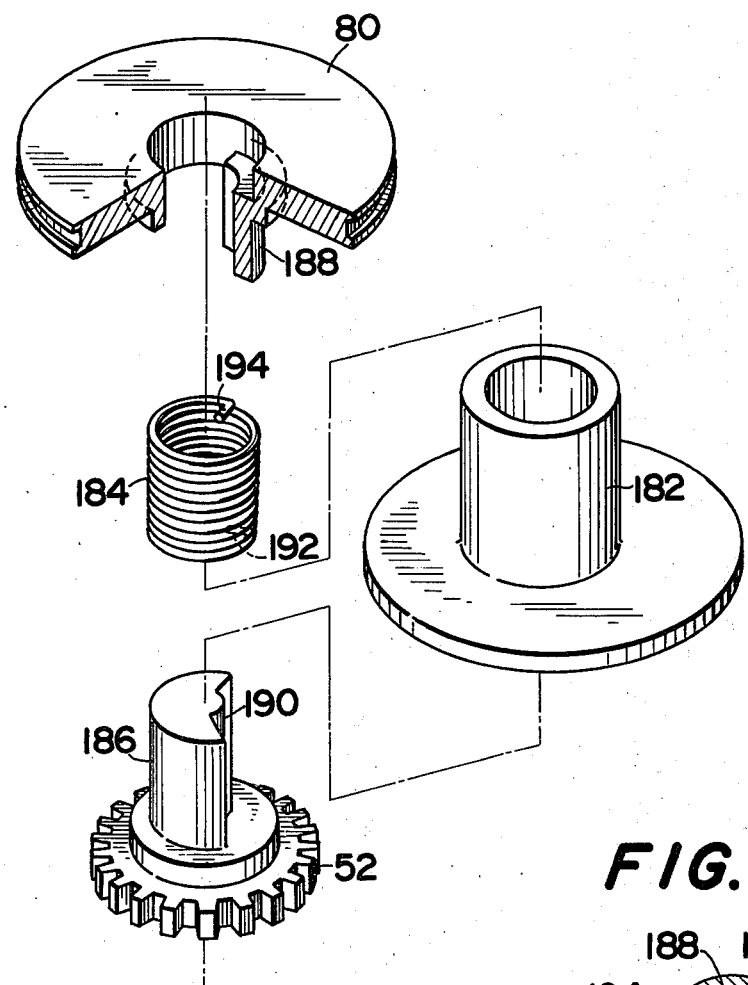
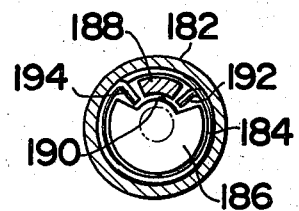

PASSIVE SEATBELT DRIVING MECHANISM

This is a continuation of application Ser. No. 057,455, filed July 13, 1979 now abandoned.

BACKGROUND OF THE INVENTION

1. Field of the Invention

This invention relates to a passive seatbelt driving mechanism for a passive seatbelt system for automatically fastening a seatbelt to an occupant after he gets on the vehicle.

2. Description of the Prior Art

In spite of the fact that high level of safety is attained by seatbelt systems in an emergency of a vehicle, the rate of seatbelt utilization is very low because of troublesome fastening process or the like. Hence, there have been proposed various types of seatbelt systems capable of automatically fastening a retaining webbing to an occupant after he gets on the vehicle. Among those various seatbelt systems, there is a passive seatbelt system constructed such that the force for opening or closing the door for getting on or off is utilized when the door is opened or closed to bring the intermediate portion of the webbing into contact with or separate same from the occupant's seat without requiring any special driving force and which is highly evaluated from the viewpoints of reliability and economy.

However, in said passive seatbelt system, the interval formed between the intermediate portion of the webbing and the occupant's seat is proportional to the value of the door opening, and hence, such a disadvantage is presented that, when the door is not fully opened, positive and sufficient space for getting on or off can not necessarily be obtained.

SUMMARY OF THE INVENTION

In view of the above facts, one object of the present invention is to provide a passive seatbelt driving mechanism capable of always forming a proper space for the occupant to get on or off the vehicle irrespective of the extent of opening of the door even in a passive seatbelt system requiring no special driving force such as a motor. In the passive seatbelt driving mechanism according to the present invention: a guide plate is provided therein with a first groove for guiding a movable shaft through which the force for opening or closing the door for getting on or off is transmitted; at the initial stage of opening up to the half-open condition of the door, the movable shaft moved in the first groove is engaged with an engageable groove of a groove plate to move the groove plate, whereby a webbing is fully moved by the driving force of a webbing driving portion connected to said groove plate; at the last stage of opening after the half-open condition of the door, said movable shaft is guided by a second groove, during which a sliding groove of the groove plate slides on the movable shaft without moving the groove plate, so that a full extent of the movement of webbing can be obtained only by opening the door for getting on or off through a predetermined angle up to the half-open condition of the door so as to allow the occupant to get on or off the vehicle; and when the door is opened through more than a predetermined angle, the webbing will not be moved.

BRIEF DESCRIPTION OF THE DRAWINGS

FIG. 2 is a plan view showing the essential portions thereof;

FIG. 3 is a cross-sectional view taken along the line III—III in FIG. 2;

FIG. 8 is a plan view showing the essential portions in a fourth embodiment of the present invention;

FIG. 9 is a cross-sectional view taken along the line IX—IX in FIG. 8;

FIG. 10 is a cross-sectional view taken along the line X—X in FIG. 9;

FIG. 11 is a disassembled oblique view of FIG. 10; and

FIG. 12 is a cross-sectional view taken along the line XII—XII in FIG. 10.

DESCRIPTION OF THE PREFERRED EMBODIMENT

Figure 1:
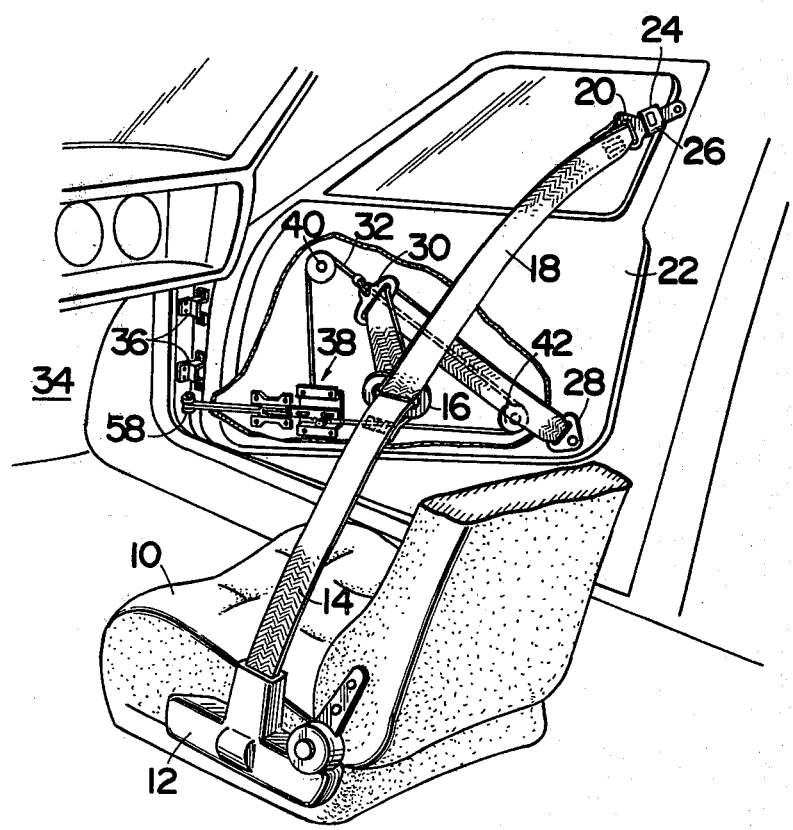
FIG. 1 is an oblique view showing a first embodiment of the passive seatbelt driving mechanism according to the present invention.

In the first embodiment of the present invention as shown in FIGS. 1 to 3, a retractor 12 is installed at the inner side of an occupant's seat 10, i.e. at the side surface of the central portion of the vehicle, which is adapted to wind up an inner webbing 14 by a biasing force. Said retractor 12 incorporates an inertia lock mechanism not shown which is adapted to instantly stop the wind-off of the inner webbing 14 in an emergency of the vehicle.

Furthermore, engaged with the forward end of the inner webbing 14 is a ring joint 16 movably turning back the intermediate portion of an outer webbing 18. Engaged with one end of said outer webbing 18 is a tongue plate 20 which is engaged with a buckle 24 solidly secured to the upper and inner side of the door 22 for getting on or off. Said buckle 24 is used for releasing the webbings in an emergency, and can readily release the tongue plate 20 by pressing a release button 26. While, the other end of the outer webbing 18 is engaged with an outer anchor 28 fastened to the lower portion of the door 22.

A slip ring 30 serving as a guide member for the intermediate portion of the webbing is movably mounted on said outer webbing 18 between the outer anchor 28 and the ring joint 16 in the longitudinal direction of the webbing, and is engaged with a wire 32 spreaded within the door.

Said wire 32 is connected at one end thereof to a driving mechanism 38 mounted adjacent a mounting hinge 36 for mounting the door 22 on the vehicle 34, the other end of the wire 32 is wound round a guide pulley 40 pivotally supported on the door adjacent the hinge 36 and immediately above said driving mechanism 38, thereafter, led in the direction opposite said guide pulley 40 on the door, i.e. toward the end portion in the turning radius of the door 22 and wound round a guide pulley 42 pivotally supported at the lower portion of the door 22, and then, wound up by the driving mechanism 38 again. Consequently, when wound up by the driving mechanism 38 in one direction, said wire 32 approaches the slip ring 30 toward the guide pulley 40, whereby the intermediate portion of the webbing 18 is moved forwardly of the vehicle, so that a space sufficient for getting on or off the vehicle can be formed between the webbings 14, 18 and the occupant's seat 10. And, when the wire 32 is moved in the direction opposite to the above by the driving mechanism 38, the slip ring 30 is moved toward the guide pulley 42 to approach the intermediate portions of the webbings 14, 18 toward the occupant's seat 10, so that the webbings can be closely attached and fastened to the occupant seated at the occupant's seat. In addition, a slit (not shown) connecting the pulley 40 to the pulley 42 is provided in the door 22 to reliably transmit the movement of the wire 32 provided in the door 22 to the outside, more specifically, to the slip ring 30 provided on the outer surface of the door 22 facing the inside of the cabin.

Next, said driving mechanism 38 mainly comprises a movable shaft 44, a guide plate 46, a groove plate 48, a rack 50 and a pinion 52 which constitute a webbing driving section as shown in FIGS. 2 and 3.

As shown in FIG. 3, said movable shaft 44 has a vertical axis and rotatably, pivotally supports at the intermediate portion in the axial direction thereof a bifurcated portion 56 of a connecting arm 54. The other end of said connecting arm 54 is pivotally supported by the vehicle 34 through a bracket 58 as shown in FIG. 1.

Said guide plate 46 is formed into a letter 'U' shape in side face, legs 60 constituting opposite end portions of said letter 'U' shape are penetratingly provided therein with a first groove 62 and a second groove 64, respectively. Said first and second grooves 62 and 64 are in parallel to each other and connected at their ends to each other through an inclined groove 66. Here, said first groove 62 is adapted to guide the movable shaft 44 at the initial stage of opening up to the half-open condition of the door 22 for getting on or off. In the case the door 22 is opened to the half-open condition, the movable shaft 44 is moved into the inclined groove 66, and in the case the door is further opened through an angle large than the half-open condition, the connecting arm 54 is adapted to drive the movable shaft 44 to move same into the second groove 64.

Furthermore, connected to the legs 60 of the guide plate 46 are mounting plates 68 which are solidly secured to the inner surface of the door 22.

Said groove plate 48 is housed within the letter 'U' shaped portion of the guide plate 46 and movable in the longitudinal direction of the grooves 62 and 64. Said groove plate 48 is provided therein with an engageable groove 60 and a sliding groove 72. Said engageable groove 70 is penetrated in a manner to be inclined at a predetermined angle relative to the first groove 62 of said guide plate 46, and has a shape substantially same shape as that of said inclined groove 66. While, the sliding groove 72 has a shape substantially same shape as that of the second groove 64 of said guide plate 46, and in the case the groove plate 48 is moved in the direction of the second groove 64, the sliding groove 72 is aligned with the second groove 64.

As shown in FIG. 3, said groove plate 48 is inserted into a space between the bifurcated portion 56 of the connecting arm and either the engageable groove 70 or the sliding groove 72 houses the movable shaft 44. Consequently, in the condition the door is closed as shown in FIGS. 2 and 3, the movable shaft 44 is at the end of the first groove 62 of the guide plate 46, whereby the movable shaft 44 is housed in the engageable groove 70 of said groove plate 48. When the door is opened from the aforesaid condition, the opening force is transmitted through the connecting arm 54 and the movable shaft 44, the engageable groove 70 is driven by the movable shaft 44 to move along with the movable shaft 44 as the movable shaft 44 moves in the first groove 62 in the direction of the inclined groove 66. Furthermore, in the case the door is opened to about half-open condition, the movable shaft 44 is moved into the second groove 64 through the inclined groove 66, whereby said movable shaft 44 is moved into the sliding groove 72 of the groove plate 48. By this, when moving in the second groove 64, the movable shaft 44 slides in the sliding groove 72, whereby no driving force is imparted to the groove plate 48.

Additionally, in the case the door 22 for getting on or off is shifted from the open condition to the closed condition, the groove plate 48 is moved by reversing the preceding steps.

Next, one end of the rack 50 is solidly secured to said groove 48, said rack 50 is penetratingly provided at the intermediate portion thereof with a slot 74 in the longitudinal direction thereof, and a pin 78 projecting from a bracket 76 is inserted into said slot 74, so that the rack 50 can be guided in the longitudinal direction.

The bracket 76 solidly secured to the door 22 pivotally supports said pinion 52 to be brought into mesh with the rack 50. Furthermore, provided at the outside of said bracket 76 is a pulley 80 of a diameter larger than the pinion 52, and a wire 32 connected to the pinion 50 and also to the slip ring 30 is wound around said pulley 80, so that the pulley 80 can increase the rotation of the pinion 52 to drive the wire 32.

Description will hereunder be given of action of the first embodiment of the present invention with the arrangement as described above. When the occupant opens the door 22 when getting on the vehicle, the opening action causes the connecting arm 54 to move the movable shaft 44 along the first groove 62 of the guide plate 46 in the direction of the inclined groove 66. While in the first groove 62, said movable shaft 44 is disposed in the engageable groove 70 of the groove plate 48, whereby the groove plate 48 moves the rack 50 in the direction of the movable shaft 44 through the engageable groove 70, to thereby rotate the pinion 52. The rotation of the pinion 52 causes the pulley 80 and the pinion 52 to rotate in unison in the counterclockwise direction in FIG. 3, thus moving the wire 32. The movement of the wire 32 causes the slip ring 30 to move in the direction of the guide pulley 40 as shown in FIG. 1, whereby the ring joint 16 winds off the inner webbing 14 from the retractor 12 and is moved forwardly of the vehicle, thereby forming a space between the webbing and the occupant's seat 10 for getting on or off the vehicle.

In the case the door 22 is opened to the half-open condition, the movable shaft 44 is inserted into the second groove 64 through the inclined groove 66 and also inserted into the sliding groove 72 of the groove plate 48, whereby, irrespective of the fact that the movable shaft 44 moves in the second groove 64, the groove plate 48 is stopped in the guide plate 46 without being subjected to the driving force from the movable shaft 44, and in the case the door is opened more than the half-open condition, the wire 32 will not be moved. Opening of the door 22 through the angle to the half-open condition causes the webbings to move to the maximum for forming a space for getting on or off between the webbings and the occupant's seat. Hence, even in the parking position where the door 22 cannot be opened to the maximum angle, a space for getting on or off can be reliably formed.

Next, when the door 22 is closed after the occupant is seated, the slip ring 30 can be moved in the direction of the guide pulley 42 by reversing the preceding steps, so that the webbings 14 and 18 can be closely attached and fastened to the occupant.

Here, in a dangerous situation of the vehicle such as collision, the retractor 12 suddenly stops the wind-off of the webbing 14, so that the occupant can be reliably restrained, thereby securing the safety of the occupant.

Next, in the case the occupant gets off the vehicle, if the door 22 is opened through a certain angle similarly to the aforesaid action, the webbings quickly and reliably form the space between the webbings and the occupant's seat 10, so that the occupant can easily get off the vehicle.

Figure 4:
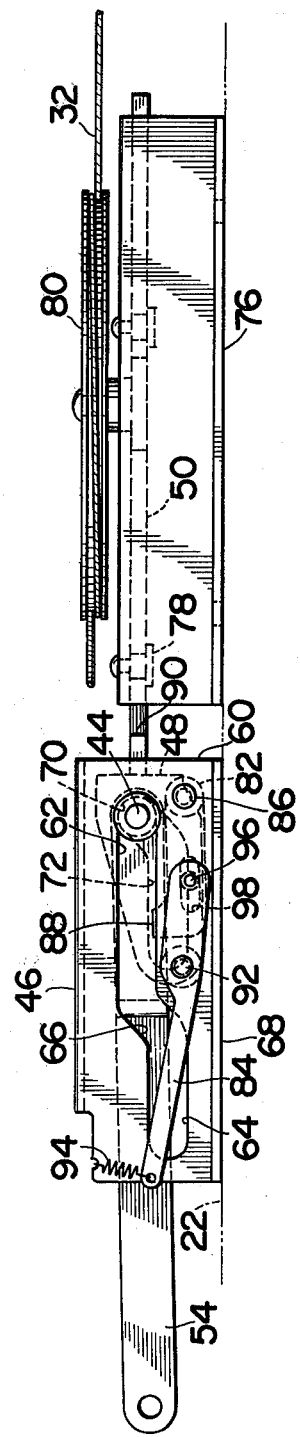
FIG. 4 is a plan view showing the essential portions of a second embodiment of the present invention.
Figure 5:
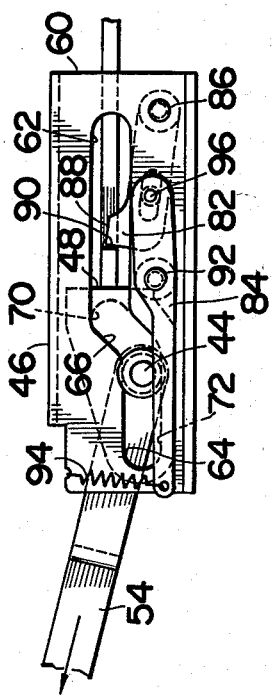
FIG. 5 is a view showing the action of FIG. 4.
Figure 6:
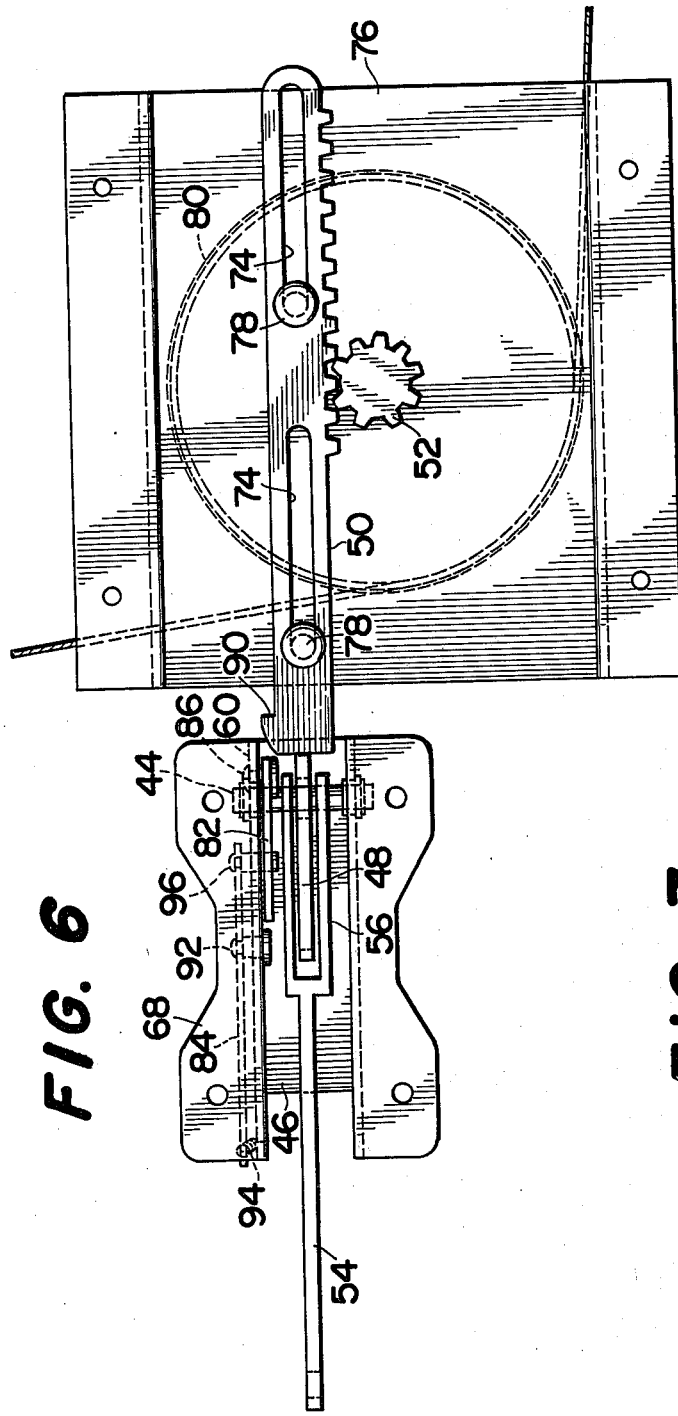
FIG. 6 is a side view of FIG. 4.

Next, FIGS. 4 through 6 show a second embodiment of the present invention in which consideration is given to preventing careless movement of webbings in the open door condition.

One of the legs 60 of the guide plate 46 is provided thereon with a stopper device including a stop lever 82 and a detecting lever 84.

Said stop lever 82 is pivotally supported at one end thereof by the leg 60 through a pin 86, and the other end thereof is formed into a stop pawl 88 bent at a right angle. When said stop pawl 88 rotates in the clockwise direction from the condition as shown in FIG. 4 to reach the condition as shown in FIG. 5, it can be engaged with a ridge 90 provided in the vicinity of a connection between the groove plate 48 and the rack 50. Engagement of said stop pawl 88 with the ridge 90 is effected when the sliding groove 72 of the groove plate is aligned with the second groove 62 of the guide plate 46, whereby the groove plate 48 is prevented from moving in the direction of the first groove 62, i.e. in the direction of closing the door.

Said detecting lever 84 is pivotally supported at the intermediate portion thereof by the leg 60 through a pin 92. A tensile spring 94 is spread between one end of said lever 84 and the leg 60 to bias and rotate said lever 84 in the clockwise direction in FIG. 4, and an engageable pin 96 is solidly secured to the other end of said lever 84 and inserted into a slot 98 provided at the intermediate portion of the stop lever 82. Said detecting lever 84 is designed such that, when rotated in the counterclockwise direction from the condition shown in FIG. 4 to the condition shown in FIG. 5, one side of said detecting lever 84 becomes an outer tangent line to the movable shaft 44 moving in the second groove 64. On the contrary, if the movable shaft 44 moves in the second groove 64, the detecting lever 84 is rotated in the counterclockwise direction in FIG. 5, whereby one side of said detecting lever 84 is adapted to be parallel to the longitudinal direction of the second groove 64. Rotation of said detecting lever 84 causes the tilting pin 96 to be engaged with the slot 98 so that the stop pawl 88 of the stop lever 82 can be engaged with the ridge 90 of the groove plate 48.

Description will hereunder be given of action of the present embodiment as arranged above. When the occupant opens the door 22 when he gets on the vehicle, the connecting arm 54 transmits this opening force to the movable shaft 44 in the same manner as in the preceding embodiment, whereby the movable shaft 44 moves toward the inclined groove 66 in the first groove 62.

Movement of the movable shaft 44 moves the groove plate 48 simultaneously through the engageable groove 70, and the rack 50 rotates the pinion 52, whereby the opening force of the door increased in value through the pulley 80 is transmitted to the wire 32, so that the webbings can be moved forwardly of the vehicle in the same manner as in the preceding embodiment, thereby forming a space for getting on the vehicle between the webbings and the occupant's seat.

While said movable shaft 44 moves in the first groove 62, the detecting lever 84 maintains the condition in FIG. 4 by the biasing force of a tensile spring 94, so that the stop pawl 88 of the stop lever does not come in contact with the ridge 90.

When the door is opened through a predetermined angle to the half-open condition of the door, the movable shaft 44 is moved into the second groove 64 in the same manner as in the preceding embodiment, whereby the movable shaft 44 performs relative movement with the sliding groove 72.

In the case the movable shaft 44 moves in the second groove 64, the detecting lever 84 is rotated in the counterclockwise direction by the movable shaft 44 against the biasing force of the tensile spring 94, so that the engageable pin 96 can engage the stop pawl 88 with the ridge 90 of the groove plate 48 to prevent the groove plate 48 from returning in the direction of the first groove 62.

As a result, even if the occupant pulls the webbings 14, 18 in the half-open condition of the door as described above, the wire 32 does not move, so that high safety can be secured.

Operation of the mechanism in the present embodiment resulted from the closing action of the door 22 by the occupant after he gets on the vehicle and also operation of the mechanism in the case of collision of the vehicle are identical with the operations in the preceding embodiment.

Figure 7:
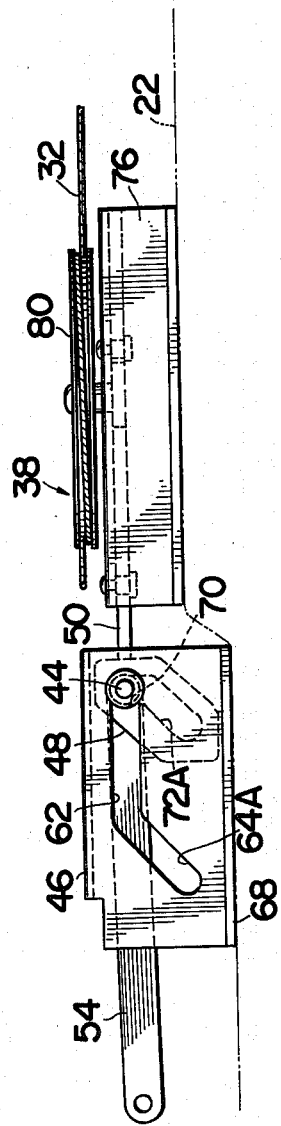
FIG. 7 is a plan view showing the essential portions in a third embodiment according to the present invention.

Next, FIG. 7 shows a third embodiment of the present invention, in which the same consideration of preventing the accidental movement of the webbings in the condition of open door as in the second embodiment is given.

More specifically, in this embodiment, the second groove 64 of the guide plate 46 and the sliding groove 72 in the first embodiment are formed into a second groove 64A and the sliding groove 72A both of which are inclined at a predetermined angle to the first groove 62. Said second groove 64A has a shape in which, substantially, the inclined groove 66 in the preceding embodiment is extended.

As a result, in the case the movable shaft 44 is in the second groove 64A and sliding groove 72A, the groove plate 48 is prevented from moving, whereby the pulley 80 does not rotate carelessly, so that the occupant can escape from being subjected to inconvenience and uncomfortable oppressive feeling.

Next, FIGS. 8 through 12 show a fourth embodiment of the present invention, in which the same consideration of preventing the accidental movement of the webbings in the condition of opened door as in the second and third embodiments is given. In this embodiment, improvements are applied to the connecting structure between the pinion 52 and pulley 80 in the first embodiment.

Specifically stating, a cylindrical bearing 182 is solidly secured to the bracket 76. Inserted into said cylindrical bearing 182 as shown in FIG. 12 is a coil spring 184, the outer periphery of which is in pressing contact with the inner peripheral surface of the cylindrical bearing 182 by a biasing force.

Inserted into said coil spring 184 from one side of the cylindrical bearing 182 is a first shaft 186 connected to the pinion 52, and from the other side is a second shaft 188 solidly secured to the pulley 80. Here, the first shaft 186 has a cutaway portion 190 being segmental in cross section as viewed from the axial direction thereof. While, the second shaft 188 has a cutaway portion being segmental in cross section but smaller than the cutaway portion 190 of the first shaft 186. Here, said first and second shaft are disposed at positions opposite to inwardly bent ends 192, 194 of the coil spring 184, respectively. In the case the first shaft 186 is rotated from the condition shown in FIG. 12, the first shaft 186 comes into contact with the end 192 or 194 to apply a force in the direction in which said ends approaches each other, whereby the outer diameter of the coil spring 184 is reduced. While, in the case the second shaft 188 is rotated, a force is applied to separate the ends 192, 194 from each other to the contrary, whereby the outer diameter of the coil spring 184 is increased.

Consequently, said cylindrical shaft 182, coil spring 184 and first and second shafts 186 and 188 constitute a detent mechanism, and when the door opening or closing force is transmitted to the pinion 52 through the rack 50, the first shaft 186 comes to be rotatable, reducing the outer diameter of the coil spring 184, whereby the second shaft 188 rotates in a manner to be clamped between the ends 192 and 194, to drive the wire 32 through the pulley 80, thus enabling to automatically fasten the webbings. However, in the case the webbings are increased in tension through being pulled by the occupant, the tensions of the webbings transmitted through the wire 32 and pulley 80 act in the direction in which the second shaft 188 increases the outer diameter of the coil spring 184 through the ends 192 and 194, whereby the coil spring 184 is not rotated, i.e., the webbings are not accidentally moved.

With the abovedescribed engagement in this fourth embodiment, even if the occupant pulls the webbings when the movable shaft 44 is in the second groove 64, i.e. after the door is opened more than the condition of half open, the tensions of the webbings transmitted to the second shaft 88 through the wire 32 and pulley 80 act in the direction in which rotation of the second shaft 88 separates the ends 192 and 194 from each other, i.e. the outer diameter of the coil spring 184 is increased, whereby the coil spring 184 is brought into firmly pressing contact with the inner peripheral surface of the cylindrical bearing 182, thus preventing the rotation of the cylindrical bearing 182. Consequently, even if the occupant tries to pull the webbings, the webbings are never moved accidentally. Other operations are similar to those in the aforesaid first embodiment.

What is claimed is:

1. A passive seatbelt driving mechanism for automatically fastening webbings to or unfastening the same from an occupant of a vehicle of the type comprising a webbing driving means provided in a door of said vehicle which is driven by the opening and closing force of said door and a lost motion linkage provided between said door and said webbing driving means for decoupling the opening and closing force of said door from said webbing driving means when said door is opened beyond a predetermined amount, said lost motion linkage comprising:

a movable shaft;

a means for applying said opening and closing force of said door for getting on or off to said movable shaft to move said movable shaft;

a guide plate formed with a first groove portion for guiding said movable shaft at an initial stage of said door opening and with a second groove portion for guiding said movable shaft when said door is opened beyond said predetermined amount; and a groove plate coupled to said webbing driving means and formed with an engagable groove portion which engages with said movable shaft when said movable shaft moves in said first groove portion and with a sliding groove portion in which said movable shaft slides when moving in said second groove portion whereby said webbing driving means receives said door opening or closing force to drive the webbing when said movable shaft is in said first groove portion and said engagable groove portion and said webbing driving means receives substantially no opening or closing force when said movable shaft is in said second groove portion and said sliding groove portion.

2. A passive seatbelt driving mechanism as set forth in claim 1, wherein said groove plate is coupled to said webbing driving means by a rack provided on said groove plate and a pinion engaging with and rotated by said rack and wherein the rotation of said pinion is coupled to said webbing driving means by a detent mechanism for preventing the webbing from being accidentally moved when said movable plate is in said second groove portion.

3. A passive seatbelt driving mechanism as set forth in claim 2, wherein said detent mechanism comprises:

a coil spring having inwardly bent ends inserted into a stationary cylindrical bearing with the outer periphery of said coil spring being brought into pressing contact with the inner periphery of said cylindrical bearing;

a first shaft coupled to said pinion and disposed at one side of said inwardly bent ends of said coil spring to make said coil spring rotatable in the direction of reducing the radium thereof; and a second shaft coupled to said webbing driving means and disposed at the other side of said inwardly bent ends of said coil spring to make said coil spring rotatable in the direction of increasing the radium thereof whereby said coil spring rotates in the direction of reducing the radium and drives said webbing driving means when said first shaft is rotated and said coil spring rotates in the direction of increasing the radium thereof and engages with said inner periphery of said stationary cylindrical bearing and is prevented from moving said movable shaft in said second groove portion when said second shaft is rotated.

4. A passive seatbelt driving mechanism as set forth in claim 1, wherein said means for applying said opening and closing force comprises a connecting arm interposed between said movable shaft and the vehicle body to transmit the door opening or closing force.

5. A passive seatbelt driving mechanism as set forth in claim 1, wherein said first and second groove portions are connected at ends to each other by an inclined groove portion.

6. A passive seatbelt driving mechanism as set forth in claim 5, wherein the engageable groove portion of said groove plate has a shape identical with that of said inclined groove portion.

7. A passive seatbelt driving mechanism as set forth in claim 6, wherein said sliding groove portion is in parallel to said first and second groove portions.

8. A passive seatbelt driving mechanism as set forth in claim 1, wherein said lost motion linkage further comprises a stopper provided on said guide plate for preventing the groove plate from moving towards the first groove portion when said movable shaft is in the second groove portion.

9. A passive seatbelt driving mechanism as set forth in claim 8, wherein said stopper comprises a stop lever pivotally supported by the guide plate, said stop lever being engaged with the groove plate to prevent the groove plate from moving in the direction of the first groove portion.

10. A passive seatbelt driving mechanism as set forth in claim 9, wherein said stopper further comprises a detecting lever provided on said guide plate and rotatable by the movable shaft moving in the second groove portion and said detecting plate rotates said stop lever to be engaged with the groove plate.

11. A passive seatbelt driving mechanism as set forth in claim 1, wherein both the second groove portion and the sliding groove portion are inclined at a predetermined angle relative to the first groove portion.

* * * * *